Patented June 17, 1930

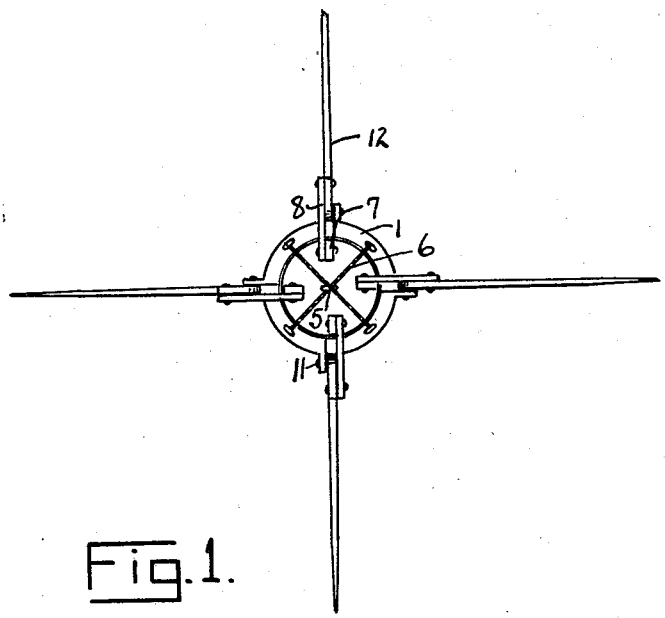
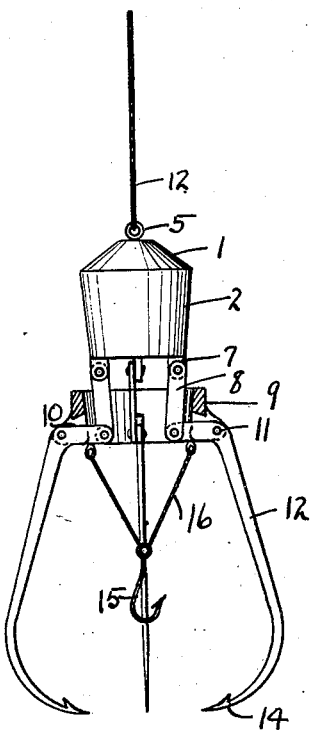
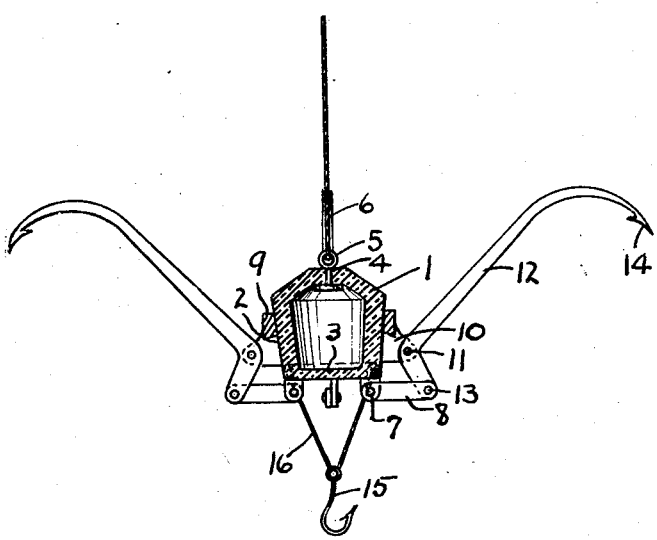

1,763,921

UNITED STATES PATENT OFFICE

WILLIAM J. BUFORD, OF HOUSTON, TEXAS, ASSIGNOR, BY DIRECT AND MESNE ASSIGNMENTS, OF FIFTY PER CENT TO WALTER R. JONES, OF HOUSTON, TEXAS

SNARE

Application filed February 20, 1928. Serial No. 255,660.

My invention pertains to snares or traps on which bait is employed to lure the fish or other game thereto. It is adapted for use either in water for fish, crabs and the like, or upon land for game or for rodents, or similar noxious animals.

It is an object of the invention to provide a means for attaching the bait which, when moved by the animal, will actuate engaging jaws to seize and hold the said animal.

It is desired to provide a hook for the bait which will tend to engage and hold the animal or fish, but which will in turn communicate movement to hooked arms to further engage and prevent the escape of the game.

Referring to the drawings herewith,

Fig. 1 is a bottom plan view of a device embodying my invention.

Fig. 2 is a side view, partly in vertical section, of a device embodying the invention; and Fig. 3 is a side elevation of the device showing the parts in engaged position.

In the carrying out of my invention, I provide a head or holder 1 which may be of some strong and durable material, and which is preferably made hollow for purposes of lightness. Said holder is circular in plan view, as shown in Fig. 1, and has its side walls 2 tapered downwardly toward the lower end 3. The upper end has a central opening therein to receive a post 4 having an eyelet 5 at its upper end for connection with a supporting line 6. This line is intended to represent an ordinary fish line or it may be any flexible supporting means to be employed on land for supporting the holder head at a point adjacent the ground where the device may be used.

Upon the lower end of the head are a plurality of downwardly projecting lugs 7, which have an opening therein to receive a pin whereby a link 8 may be pivotally connected therewith. These supporting lugs are spaced uniformly about the lower end of the holder, and I have shown four such lugs with four links 8 pivotally connected therewith.

I have provided a ring 9 adapted to fit about the outer surface of the holder 2. It has its inner surface tapered to fit upon the outer face of the holder and is adapted, when moved upwardly, to engage with the walls of the holder to be supported frictionally thereon. It may be of any desired material and so formed as to engage tightly against the outer surface of the holder and should be removed therefrom only by a downward jerk upon said ring.

Said ring is provided with a series of downwardly extending ears 10, four in number, and spaced about the lugs 7 on the holder. These ears are connected at 11 with an arm 12 of a hooked engaging member having a bell crank shaped inner end. One arm of said lever is connected to the outer end 13 of the link 8. The outer arm is elongated and is curved and barbed at 14 to provide a gripping member to engage with the animal which is trapped. The elbow of the lever which is engaged with the ring 9 may be drawn upwardly when the ring is fixed about the body 2, and when in this position, the arms 12 will be thrown up into the position shown in Fig. 2.

The bait may be supported upon a hook 15 which may be similar to the ordinary fishhook. It is connected by flexible members 16 with the ring 9 so that when a pull is communicated to the hook 15, it will move the ring 9 downwardly and release it from the holder and allow the arms 12 to drop by gravity into the position shown in Fig. 3. The ring will drop to a position about the links 8 and the arms 12 with the hooked ends 14 will move into a position closely spaced from each other so as to engage with the victim in the trap.

When this device is employed in fishing, the bait may be suspended upon the hook 15 with the hooked arms 12 in elevated position, as shown in Fig. 2. The device may then be lowered to the vicinity of the fish which it is desired to catch, and any fish nibbling upon the hook 15 sufficiently to exert a pull thereon will release the ring 9 from the holder so as to pull the arms 12 downwardly and bring the hooked ends 14 against the fish so as to entrap the fish between the four ends of the arms. An upward pull upon the line will then draw the fish to the surface. By the use of this type of device, a fish may be caught even though it does not take the hook 15 so as to be caught thereon. Fish nibbling and pulling at the bait without taking the hook may be trapped in this manner.

When the device is used and is baited for an animal trap, it will be employed in about the same way. The device will be supported on any available support so as to place the hook 15 within easy reach of the animal upon the ground. When the animal bites upon the bait even though he is not caught by the hook 15, an upward pull upon the line will tend to release the arms 12 of the trap so as to allow them to drop by gravity and seize and hold the animal in that position. It will be noted that when the ring drops into the position shown in Fig. 3, it acts to prevent the upward springing of the jaws as long as the ring remains in that position.

The advantages of this type of construction are obvious and will need no further explanation. What I claim as new is:

1. A device of the character described, including a holder, a plurality of hooked arms pivoted thereon, a ring releasably secured on said holder and having a pivotal connection with said arms, the said ring acting when in set position to hold said arms elevated, a hook secured to said ring and adapted to communicate a strain thereto to move it from set position, and means to support said holder.

2. In a device of the character described, a holder having means to suspend the same, jaws pivoted to said holder, a ring frictionally engaging said holder and pivoted to said jaws to support said jaws in inoperative position, and bait supporting means connected with said ring.

3. A holder having means to suspend the same, jaws pivoted to said holder, a ring releasably engaging said holder to hold said jaws in inoperative position, a bait supporting means on said ring, said holder engaging means being responsive to a pull exerted upon said bait supporting means to release said jaws.

4. A holder, a ring fitting frictionally about said holder, links on said holder, jaws pivoted to said ring and said links, bait supporting means connected with said ring and responsive to a pull exerted thereon, to release said jaws, said jaws being held in closed position by said ring.

In testimony whereof I hereunto affix my signature this 16th day of February, A. D. 1928.

WILLIAM J. BUFORD.